United States Patent
Hamada et al.

(10) Patent No.: US 12,138,593 B2
(45) Date of Patent: Nov. 12, 2024

(54) METHOD FOR PREPARING WATER QUALITY PROFILE, METHOD FOR INSPECTING SEPARATION MEMBRANE MODULE, AND WATER TREATMENT APPARATUS

(71) Applicant: Toray Industries, Inc., Tokyo (JP)

(72) Inventors: Hiroshi Hamada, Otsu (JP); Masahide Taniguchi, Otsu (JP); Kazunori Tomioka, Otsu (JP)

(73) Assignee: Toray Industries, Inc., Tokyo (JP)

( * ) Notice: Subject to any disclaimer, the term of this patent is extended or adjusted under 35 U.S.C. 154(b) by 621 days.

(21) Appl. No.: 17/281,634

(22) PCT Filed: Oct. 3, 2019

(86) PCT No.: PCT/JP2019/039196
§ 371 (c)(1),
(2) Date: Mar. 31, 2021

(87) PCT Pub. No.: WO2020/071507
PCT Pub. Date: Apr. 9, 2020

(65) Prior Publication Data
US 2021/0370235 A1 Dec. 2, 2021

(30) Foreign Application Priority Data
Oct. 3, 2018 (JP) .................. 2018-188080

(51) Int. Cl.
*B01D 65/10* (2006.01)
*C02F 1/00* (2023.01)
*C02F 1/44* (2023.01)

(52) U.S. Cl.
CPC ............ *B01D 65/104* (2013.01); *C02F 1/008* (2013.01); *C02F 1/44* (2013.01); *C02F 2209/40* (2013.01)

(58) Field of Classification Search
None
See application file for complete search history.

(56) References Cited

U.S. PATENT DOCUMENTS

| 2005/0029192 A1* | 2/2005 | Arnold | B01D 61/025 |
| | | | 210/652 |
| 2005/0194317 A1 | 9/2005 | Ikeyama et al. | |

(Continued)

FOREIGN PATENT DOCUMENTS

| CN | 1162569 A | 10/1997 |
| CN | 102897872 A | 1/2013 |

(Continued)

OTHER PUBLICATIONS

International Search Report and Written Opinion for International Application No. PCT/JP2019/039196, dated Dec. 3, 2019, 5 pages.

(Continued)

*Primary Examiner* — Krishnan S Menon
(74) *Attorney, Agent, or Firm* — Buchanan Ingersoll & Rooney PC (57) ABSTRACT

The present invention provides a method for preparing a water quality profile that has (1) a step 1 for supplying water to be treated to a separation membrane module with a supply port for the water being treated and multiple permeate outlets and obtaining permeate, (2) a step 2 for varying the ratio of the flow rates of the respective permeates flowing out of the multiple permeate outlets, (3) a step 3 after step 2 for measuring the respective water qualities of the permeates, and (4) a step 4 for plotting the relationship between the ratio of the respective permeate flow rates varied in step 2 and the respective water qualities of the permeates measured in step 3 as a scatter diagram, steps 2-4 being repeated multiple times.

4 Claims, 4 Drawing Sheets

(56) References Cited

U.S. PATENT DOCUMENTS

| | | |
|---|---|---|
| 2009/0032477 A1 | 2/2009 | Ikeyama et al. |
| 2011/0079546 A1 | 4/2011 | Konishi et al. |
| 2011/0309007 A1 | 12/2011 | Ito et al. |
| 2015/0053596 A1 | 2/2015 | Kageyama et al. |
| 2016/0038882 A1 | 2/2016 | Ito et al. |
| 2018/0161730 A1 | 6/2018 | Coster et al. |

FOREIGN PATENT DOCUMENTS

| | | |
|---|---|---|
| CN | 103626263 A | 3/2014 |
| CN | 105621684 A | 6/2016 |
| JP | 2010179264 A | 8/2010 |
| JP | 5001140 B2 | 8/2012 |
| JP | 2013022543 A | 2/2013 |
| JP | 5271608 B2 | 8/2013 |
| JP | 2013154293 A | 8/2013 |
| JP | 2015042385 A | 3/2015 |

OTHER PUBLICATIONS

Chinese Office Action for Chinese Application No. 201980065050.9, issued Mar. 16, 2022, with translation, 23 pages.

\* cited by examiner

METHOD FOR PREPARING WATER QUALITY PROFILE, METHOD FOR INSPECTING SEPARATION MEMBRANE MODULE, AND WATER TREATMENT APPARATUS

CROSS REFERENCE TO RELATED APPLICATIONS

This is the U.S. National Phase application of PCT/JP2019/039196, filed Oct. 3, 2019, which claims priority to Japanese Patent Application No. 2018-188080, filed Oct. 3, 2018, the disclosures of each of these applications being incorporated herein by reference in their entireties for all purposes.

FIELD OF THE INVENTION

The present invention relates to a method of preparing a water-quality profile, a method of inspecting a separation membrane module, and a water treatment device.

BACKGROUND OF THE INVENTION

Fluid separation techniques employing various separation membranes including a reverse osmosis membrane, a nanofiltration membrane, an ultrafiltration membrane, and a microfiltration membrane have been developed in recent years. For example, a water treatment process is known in which use is made of a separation membrane module including a pressure vessel and a separation membrane element housed therein which includes any of those separation membranes.

In such a water treatment process, a treatment such as chemical cleaning is usually repeated besides an ordinary operation. Because of this, the separation membrane element unavoidably suffers an occurrence of abnormality such as damage, breakage, or deterioration. Meanwhile, it is extremely important to quickly detect the occurrence of any abnormality in the separation membrane module, specify the location where the abnormality has occurred as quickly as possible, and take a measure in the early stage.

Known as a method of detecting the occurrence of an abnormality in a separation membrane module is a method in which radio tags (RFID tags), sensors, or the like is provided to separation membrane elements included in the separation membrane module to monitor the state of the separation membrane elements (Patent Literatures 1 and 2).

PATENT LITERATURE

Patent Literature 1: Japanese Patent No. 5001140
Patent Literature 2: Japanese Patent No. 5271608

SUMMARY OF THE INVENTION

However, in the conventional method in which sensors or the like is provided to separation membrane elements, an abnormality in the separation membrane module cannot be detected with high accuracy if the number of the provided sensors or the like is insufficient. Meanwhile, in cases when the number of sensors or the like is increased in order to sufficiently heighten the accuracy of abnormality detection, this poses a problem that the overall cost of the water treatment device is increased.

Accordingly, an object of the present invention is to provide a method of preparing a water-quality profile, which enables to quickly and extremely easily detect the occurrence of an abnormality in a separation membrane module and specify the degree of the abnormality and the location where the abnormality has occurred with high accuracy.

The present invention according to exemplary embodiments provides, in order to accomplish the object, a method of preparing a water-quality profile, the method including:

(1) step 1 of obtaining permeates by feeding a water-to-be-treated to a separation membrane module including a water-to-be-treated feed port and a plurality of permeate outlets;

(2) step 2 of changing a ratio between flow rates of the respective permeates flowing out through the plurality of permeate outlets;

(3) step 3 of measuring water qualities of the respective permeates after the step 2; and (4) step 4 of plotting a relation between the ratio between the flow rates of the respective permeates, which was changed in the step 2, and the water qualities of the respective permeates, which were measured in the step 3, as a scatter diagram, and repeatedly performing the steps 2 to 4 several times.

According to the present invention, not only the occurrence of an abnormality in a separation membrane module but also the degree and location thereof can be quickly and extremely easily detected with high accuracy. By taking a measure against the abnormality in the early stage accordingly, the maintenance of the water treatment device can be rendered highly efficient.

DETAILED DESCRIPTION OF EMBODIMENTS OF THE INVENTION

Embodiments of the present invention are explained in detail below using the drawings for reference. However, the present invention is not limited at all by the following embodiments.

A method of inspecting a separation membrane module according to one aspect of the present invention is characterized by including:

(1) step 1 of obtaining permeates by feeding a water-to-be-treated to a separation membrane module including a water-to-be-treated feed port and a plurality of permeate outlets;

(2) step 2 of changing a ratio between flow rates of the respective permeates flowing out through the plurality of permeate outlets; and (3) step 3 of measuring water qualities of the respective permeates after the step 2.

A water treatment device for practicing such method of inspecting a separation membrane module according to one aspect of the present invention needs to include:

a separation membrane module including a water-to-be-treated feed port and a plurality of permeate outlets;

a flow rate control means of independently changing flow rates of respective permeates flowing out through the plurality of permeate outlets;

a water quality measurement means of measuring water qualities of the respective permeates flowing out through the plurality of permeate outlets; and a detection means of detecting a presence or absence of an abnormality in the separation membrane module, a degree of the abnormality or a location where the abnormality occurred, from a relation between changes in the flow rates of the respective permeates and the water qualities of the respective permeates.

Figure 1:
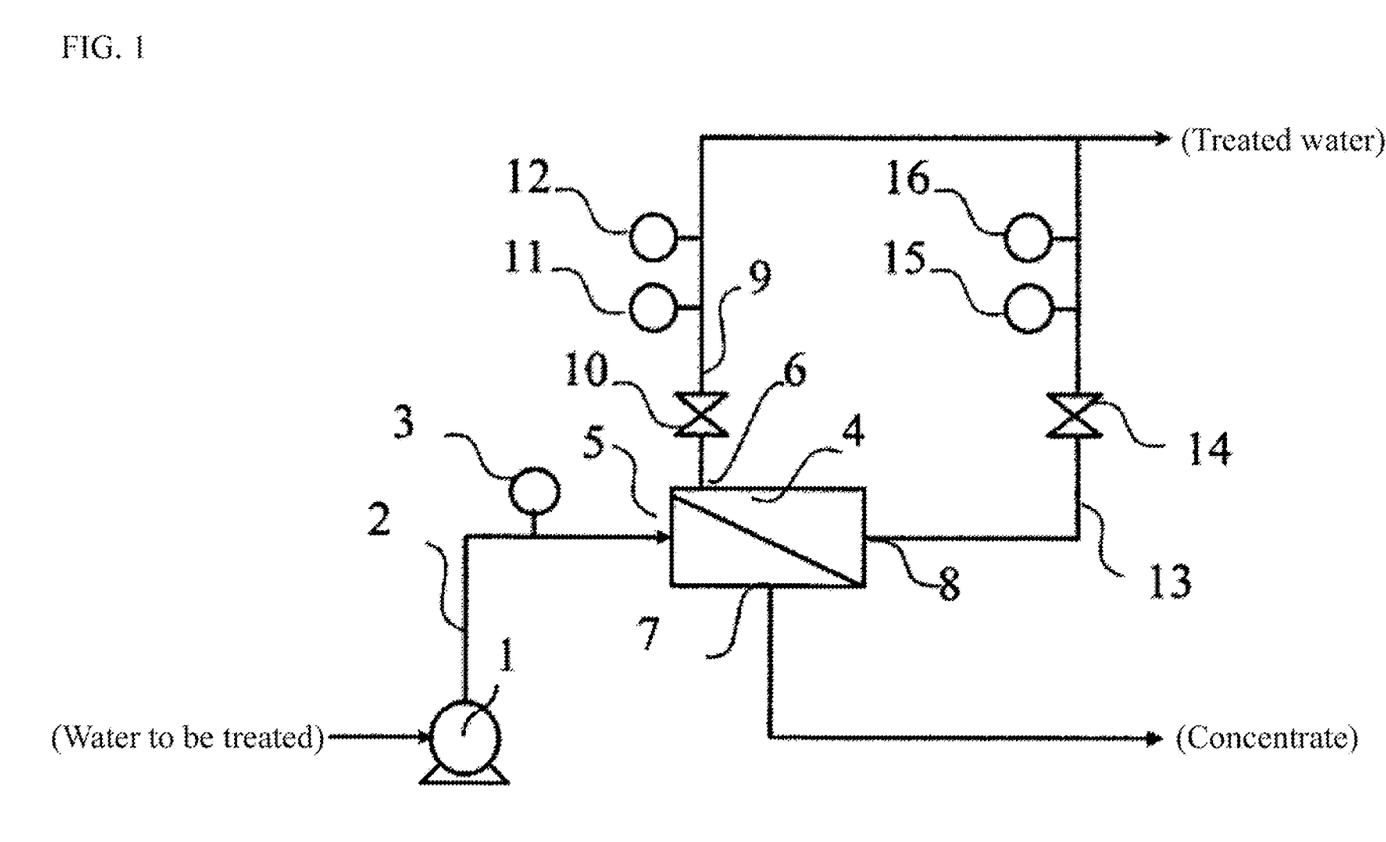
FIG. 1 is a schematic flowchart showing an example of the configurations of water treatment devices for practicing the method according to embodiments of the present invention for inspecting a separation membrane module.

In FIG. 1 is shown an example of the configurations of such water treatment devices for practicing the method of inspecting a separation membrane module according to one aspect of the present invention.

The separation membrane module 4 includes a water-to-be-treated feed port 5 and two, i.e., a plurality of, permeate outlets, a first permeate outlet 6 and a second permeate outlet 8. Water-to-be-treated is fed, at a given flow rate, to the separation membrane module 4 by a high-pressure pump 1 via a water-to-be-treated feed pipeline 2. The pressure of the water-to-be-treated being fed to the separation membrane module 4 is measured with a pressure gauge 3 provided to the water-to-be-treated feed pipeline 2.

Examples of the water-to-be-treated fed to the separation membrane module include seawater, river water, groundwater, and water obtained by treating sewage or wastewater. Especially in the case where the water-to-be-treated is seawater, since there is a large difference in water quality between the water-to-be-treated and the permeate thereof, an abnormality in the separation membrane module can be more easily detected by the method of inspecting a separation membrane module according to one aspect of the present invention.

The term "separation membrane module" herein means a device including one or more separation membrane elements and a pressure vessel housing the separation membrane elements therein. In separation membrane modules, abnormalities are prone to occur not only in the separation membranes and other components of each separation membrane element but also in parts (e.g., the connectors which will be described later) connecting the separation membrane elements to each other. Because of this, the method of inspecting a separation membrane module according to one aspect of the present invention can advantageously exhibit the effect thereof when applied to a separation membrane module including a plurality of separation membrane elements.

The term "separation membrane element" means a form configured so that a separation membrane is used in a water treatment process for filtrating water-to-be-treated with the separation membrane to obtain a permeate.

The separation membrane included in the separation membrane element is a membrane for filtrating water-to-be-treated therewith by means of a pressure difference between both sides of the membrane and thereby trapping substances which are contained in the water-to-be-treated and have a size larger than a certain particle diameter. Examples thereof include a reverse osmosis membrane, a nanofiltration membrane, an ultrafiltration membrane, a microfiltration membrane, and a dynamic filtration membrane.

The method of inspecting a separation membrane module according to one aspect of the present invention can advantageously exhibit the effect thereof when applied to a separation membrane module including a reverse osmosis membrane, nanofiltration membrane, ultrafiltration membrane, or microfiltration membrane, which has high processing performance and in which the processing performance hence is considerably affected by the occurrence of any abnormality. In addition, this inspection method can advantageously exhibit the effect thereof especially when applied to a separation membrane module including a reverse osmosis membrane because even a slight abnormality can be extremely easily detected on the basis of a change in permeate water quality.

Examples of forms of separation membranes include flat membrane and hollow-fiber membrane. Examples of separation membrane elements including flat membranes include a spiral type separation membrane element including a center pipe and a flat separation membrane wound therearound. Examples of separation membrane elements including hollow-fiber membranes include a separation membrane element including a cylindrical case and a bundle of hollow-fiber membranes packed thereinto.

In the case where a water-to-be-treated feed port and a concentrate outlet have been disposed at both longitudinal-direction ends of the pressure vessel and the reverse osmosis membrane element so as to face each other, water-to-be-treated flows in the longitudinal direction of the separation membrane module and is treated while moving from the water-to-be-treated feed port side (upstream side) toward the side (downstream side) opposite to the water-to-be-treated feed port. If an abnormality has occurred at a specific position in this separation membrane module, a deterioration in the water quality of the permeate occurs downstream from the location where the abnormality has occurred.

It is preferable that a plurality of permeate outlets have been disposed at different positions along the longitudinal direction of such a separation membrane module in order to more finely grasp the behavior of the water quality of the permeate along the longitudinal direction of the separation membrane module and to more clearly detect the presence or absence of any abnormality and the location where the abnormality has occurred. For example, in a separation membrane module including a spiral type separation element, permeate outlets have generally been disposed at both longitudinal-direction ends of the pressure vessel. This configuration can be regarded as having a plurality of permeate outlets disposed at different positions along the longitudinal direction of the separation membrane module.

The flow rates of permeates flowing out respectively from the first permeate outlet 6 and the second permeate outlet 8 into a first permeate pipeline 9 and a second permeate pipeline 13 can be independently changed with a first flow rate control valve 10 and a second flow rate control valve 14, which are an example of flow control means. The flow rates of the permeates respectively flowing into the first permeate pipeline 9 and the second permeate pipeline 13 are measured with a first flow meter 11 and a second flow meter 15, and the water quality of each of the permeates is determined with a first water quality analyzer 12 and a second water quality analyzer 16.

The first flow rate control valve 10 and the second flow rate control valve 14 may be either manual valves or automatic regulating valves, but automatic control valves are preferred from the standpoint of controlling the flow rates with high accuracy. Examples of the valves themselves include globe valves, butterfly valves, and ball valves. The flow rate at which the water-to-be-treated is supplied can be controlled by changing the rotational speed of the high-pressure pump 1 with an inverter included in the high-pressure pump 1.

It is preferable that the water quality to be determined by the first water quality analyzer 12 and second water quality analyzer 16 is an index selected from the group consisting of electrical conductivity, resistivity, evaporation-residue concentration, salt concentration, boron concentration, ultraviolet absorbance, radioactive-substance concentration, and turbidity, because of the ease of on-line determination. From the standpoint of more easily detecting an abnormality, a more preferred index for the reverse osmosis membrane element is electrical conductivity and a more preferred index for the ultrafiltration membrane element is turbidity.

Figure 2:
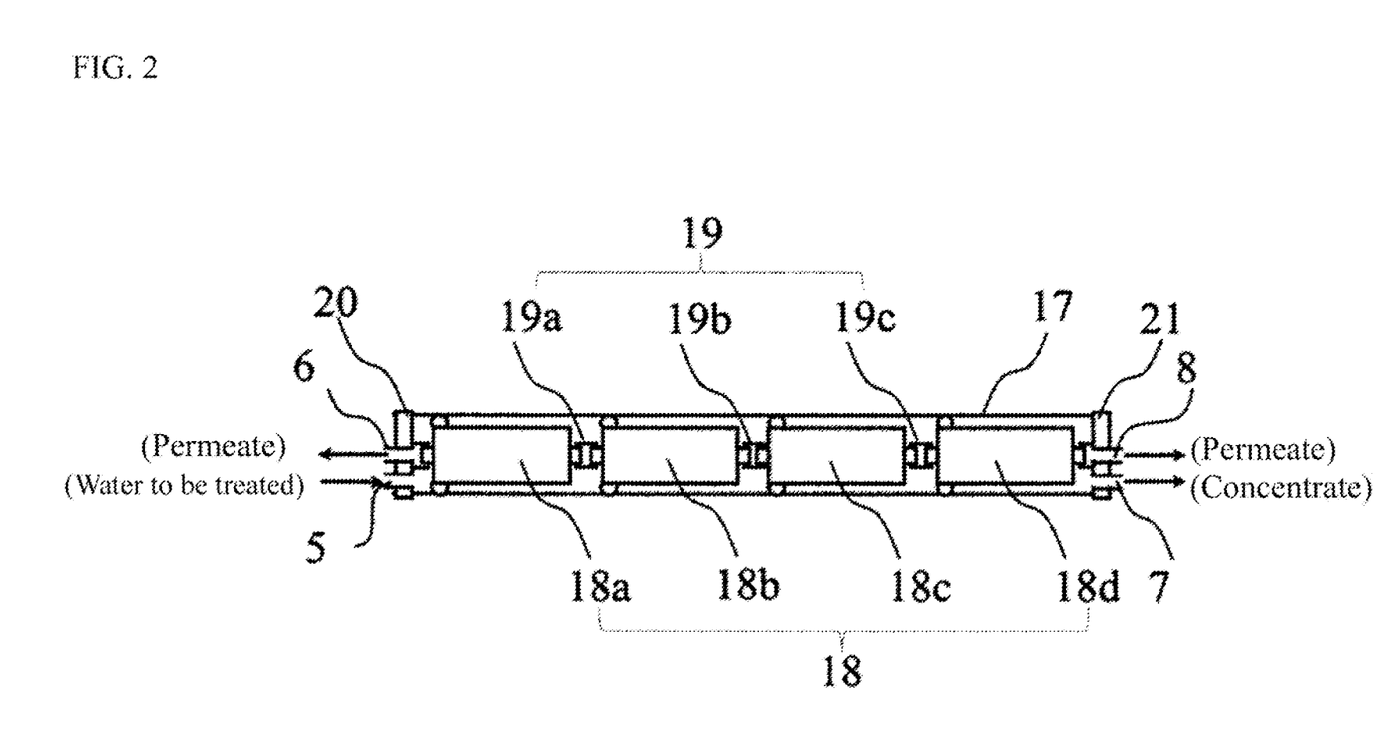
FIG. 2 is a schematic view illustrating the inside of the separation membrane module 4 of FIG. 1, which is viewed from a direction perpendicular to the longitudinal direction of the separation membrane module 4.

FIG. 2 is a schematic view illustrating the inside of the separation membrane module 4 of FIG. 1, which is viewed from a direction perpendicular to the longitudinal direction of the separation membrane module 4. In the pressure vessel 17 of the separation membrane module 4, a total of four spiral type reverse osmosis membrane elements 18 (18a, 18b, 18c, 18d) are housed, and the center pipes of the respective elements 18 have been connected to each other with connectors 19 (19a, 19b, 19c) so that the elements 18 are arranged in series along the longitudinal direction of the separation membrane module 4.

In FIG. 2, the water-to-be-treated feed port 5, a concentrate outlet 7, the first permeate outlet 6, and the second permeate outlet 8 all have been disposed in an end plate 20 and an end plate 21 which are located at both longitudinal-direction ends of the separation membrane module 4. However, the positions thereof are not limited to those in this embodiment.

In the water treatment device shown as an example in FIG. 1 and FIG. 2, water-to-be-treated is sent via the water-to-be-treated feed pipeline 2 and supplied through the water-to-be-treated feed port 5 to the reverse osmosis membrane element 18a. The concentrate which has been treated with the reverse osmosis membrane element 18a is supplied successively to the adjoining reverse osmosis membrane elements 18b, 18c, and 18d, treated therewith, and then finally discharged from the concentrate outlet 7.

The method of inspecting a separation membrane module according to one aspect of the present invention is characterized in that the steps 2 and 3 are repeatedly performed several times and from a result thereof, a presence or absence of an abnormality in the separation membrane module, a degree of the abnormality, or a location where the abnormality occurred is detected.

The water treatment device for practicing such method of inspecting a separation membrane module according to one aspect of the present invention needs to include a detection means which detects a presence or absence of any abnormality in the separation membrane module, the degree of the abnormality or the location where the abnormality has occurred, from a relation between changes in the flow rate of each of the permeates and the water quality of each of the permeates.

There are no particular limitations on methods for detecting a presence or absence of any abnormality in the separation membrane module, the degree of the abnormality or the location where the abnormality has occurred, from a relation between changes in the flow rate of each of the permeates and the water quality of each of the permeates, the relation being obtained from the results of the steps 2 and 3 which have been repeatedly performed several times. Examples thereof include a method in which a relation between the flow-rate ratio between the permeates which was changed in the step 2 and the water quality of each of the permeates which was measured in the step 3 is plotted to draw a water-quality profile as a scatter diagram and the detection is made on the basis of the water-quality profile.

That is, the method of preparing a water-quality profile according to one aspect of the present invention is characterized by including:

(1) step 1 of obtaining permeates by feeding a water-to-be-treated to a separation membrane module including a water-to-be-treated feed port and a plurality of permeate outlets;

(2) step 2 of changing a ratio between flow rates of the respective permeates flowing out through the plurality of permeate outlets;

(3) step 3 of measuring water qualities of the respective permeates after the step 2; and (4) step 4 of plotting a relation between the ratio between the flow rates of the respective permeates, which was changed in the step 2, and the water qualities of the respective permeates, which were measured in the step 3, as a scatter diagram, and repeatedly performing the steps 2 to 4 several times.

The number of repetitions of the steps 2 to 4 is not particularly limited. It is, however, preferable that the number thereof is as large as possible from the standpoint of increasing the number of plot points for the scatter diagram so that the presence or absence of any abnormality in the separation membrane module, the degree of the abnormality, or the location where the abnormality has occurred can be detected with higher accuracy.

Since the water quality of each of the permeates is affected also by the amount of the permeate and recovery, it is preferable that the flow rate of the water-to-be-treated being fed to the separation membrane module and the sum of the flow rates of the permeates in steps 1 to 4 are constant.

That is, it is preferable that the method of preparing a water-quality profile according to one aspect of the present invention is characterized by including:

(1) step 1 of obtaining permeates by feeding a water-to-be-treated at a flow rate Q1 to a separation membrane module including a water-to-be-treated feed port and a plurality of permeate outlets;

(2) step 2 of changing a ratio between flow rates of the respective permeates flowing out through the plurality of permeate outlets while maintaining the flow rate Q1 and maintaining a total flow rate Q2 of the respective permeates;

(3) step 3 of measuring water qualities of the respective permeates after the step 2; and (4) step 4 of plotting a relation between the ratio between the flow rates of the respective permeates, which was changed in the step 2, and the water qualities of the respective permeates, which were measured in the step 3, as a scatter diagram, and repeatedly performing the steps 2 to 4 several times.

It is preferable that the flow rate Q1 of the water-to-be-treated and the total flow rate Q2 of the permeates are each maintained so that the fluctuations thereof are within 10%. More preferably, the Q1 and the Q2 are each constant. However, even in cases when the flow rate Q1 of the water-to-be-treated and the total flow rate Q2 of the permeates changed by 10% or more, a water-quality profile according to one aspect of the present invention can be prepared by correcting the influence of flow rate.

Figure 3A:
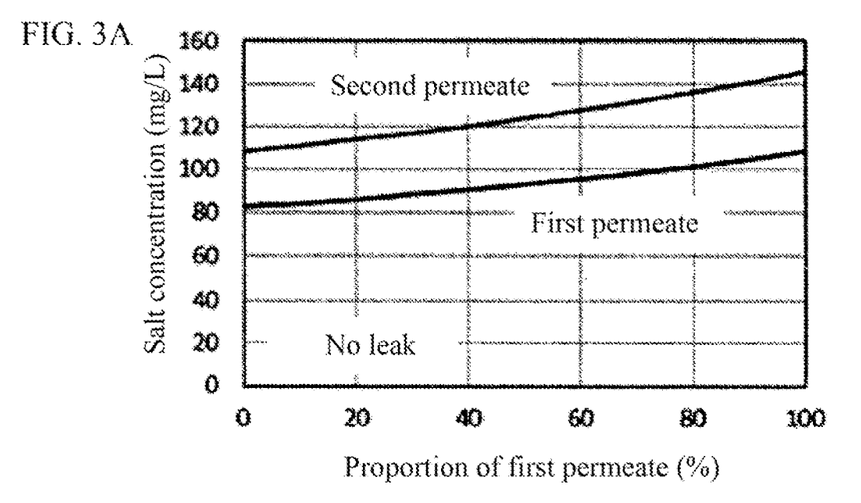
FIG. 3A and FIG. 3B are examples of water-quality profiles prepared by the method according to embodiments of the present invention for preparing a water-quality profile.
Figure 3B:
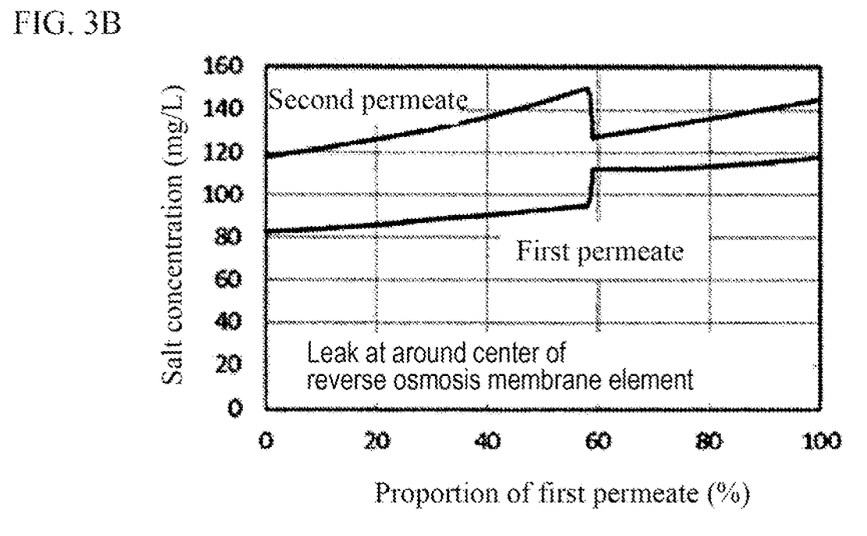

FIG. 3A and FIG. 3B show examples of water-quality profiles prepared by the method of preparing a water-quality profile according to one aspect of the present invention. The water-quality profiles shown in FIG. 3A and FIG. 3B are water-quality profiles of a separation membrane module including one reverse osmosis membrane element housed in a pressure vessel and having two permeate outlets, in which the abscissa indicates changes of the flow-rate ratio between the permeates flowing out respectively through the first permeate outlet and the second permeate outlet (hereinafter referred to respectively as "first permeate" and "second permeate") and the ordinate indicates changes of the water quality of the first permeate and second permeate. More specifically, the abscissa indicates the proportion (%) of the flow rate of the first permeate to the total flow rate of the first permeate and the second permeate, and the ordinate indicates the salt concentration of the first permeate and that of the second permeate, the salt concentration being an index of the water quality of each permeate.

The water quality profile shown in FIG. 3A indicates that the separation membrane module has no abnormality, i.e., is in a normal state. In this example, a water-to-be-treated feed port and a concentrate outlet have been disposed at both longitudinal-direction ends of the pressure vessel and reverse osmosis membrane element so as to face each other. In this separation membrane module, a first permeate outlet has been disposed on the same side as the water-to-be-treated feed port and a second permeate outlet has been disposed on the side opposite thereto.

Because of this, in the separation membrane module, the water-to-be-treated present on the water-to-be-treated feed port side (upstream side) has a lower salt concentration and the water-to-be-treated present on the side (downstream side) opposite from the water-to-be-treated feed port has a higher salt concentration. Since the reverse osmosis membrane element has a constant salt rejection rate, an increase in the salt concentration of the water-to-be-treated results in an increase in the salt concentration of the permeate. As a result, the second permeate has a higher salt concentration than the first permeate. Consequently, in cases when the proportion of the first permeate is increased, then the first permeate comes to contain a larger amount of a downstream permeate and, hence, the salt concentration of the first permeate increases gradually. Meanwhile, the second permeate comes to contain a smaller amount of an upstream permeate and, hence, the salt concentration of the second permeate also increases gradually.

The water-quality profile shown in FIG. 3B indicates that in the separation membrane module, an abnormality has occurred at around the longitudinal-direction center of the reverse osmosis membrane element and some of the water-to-be-treated has leaked out to the permeate side. In this example also, a water-to-be-treated feed port and a concentrate outlet have been disposed at both longitudinal-direction ends of the pressure vessel and reverse osmosis membrane element so as to face each other, and in this separation membrane module, a first permeate outlet has been disposed on the same side as the water-to-be-treated feed port and a second permeate outlet has been disposed on the side opposite thereto.

In this example, plots of the salt concentrations of the first permeate and second permeate each do not give a gradually ascending curve but result in an inflection point between permeate proportions for the case where the water-to-be-treated which has leaked out is contained in the first-permeate side and permeate proportions for the case where the water-to-be-treated which has leaked out is contained in the second-permeate side. Similar inflection points appear not only in such cases where some of the water-to-be-treated has leaked out to the permeate side but also in the case where the separation membrane has come to have a decrease in processing performance due to, for example, deterioration thereof.

Consequently, a presence or absence of any abnormality of the separation membrane module can be detected by preparing a water-quality profile by the method of preparing a water-quality profile according to one aspect of the present invention and examining and analyzing the shape of any inflection point or the like shown in the water-quality profile. Furthermore, the degree of the abnormality of the separation membrane module or the location where the abnormality has occurred, including the portion where the abnormality has occurred (for example, whether the portion is a separation membrane or a connector), can also be detected on the basis of the width over which the water quality fluctuates at an inflection point, the number of inflection points which have appeared in the scatter diagram, the position of each inflection point on the abscissa of the scatter diagram, etc.

Any abnormality of the separation membrane module can be detected with higher accuracy by preparing beforehand a water-quality profile of the separation membrane module which is in a normal state involving no abnormality, as shown in FIG. 3A, and comparing this water-quality profile with a water-quality profile of the separation membrane module in which an abnormality has occurred. It is preferable that the two water-quality profiles are compared while directing attention to the degree of difference in maximum values, integral values, or differential values.

In practicing the method of preparing a water-quality profile according to one aspect of the present invention, operation conditions in step 1, such as the pressure or flow rate of the water-to-be-treated being fed or the recovery, may be changed from ordinary-operation conditions in order to make any change in the water quality of the permeate more noticeable. For example, the separation membrane module including reverse osmosis membrane elements may be operated under the same conditions as standard conditions for evaluating the performance of the reverse osmosis membrane which have been set by the manufacturer thereof. Thus, the occurrence of an abnormality can be detected with extremely high accuracy.

Moreover, it is also preferable that model water which is constant and consists of known components is used as water-to-be-treated, in order to detect any abnormality in the separation membrane module with higher accuracy without being affected by fluctuations of the water quality or the like of the water-to-be-treated. A water-quality index marker which facilitates the detection or visualization, such as a suspended substance, fine particles, a salt, or a fluorescent dye, may be added to the model water. It is preferable that the water-quality index marker is one against which the separation membrane has a high rejection rate, from the standpoint of obtaining a more noticeable change in water quality of permeate in cases when an abnormality has occurred.

It is also preferable that the preparation of a water-quality profile by the method of preparing a water-quality profile according to one aspect of the present invention is intermittently continued at regular intervals in order to detect any abnormality of the separation membrane module with high accuracy.

Figure 4:
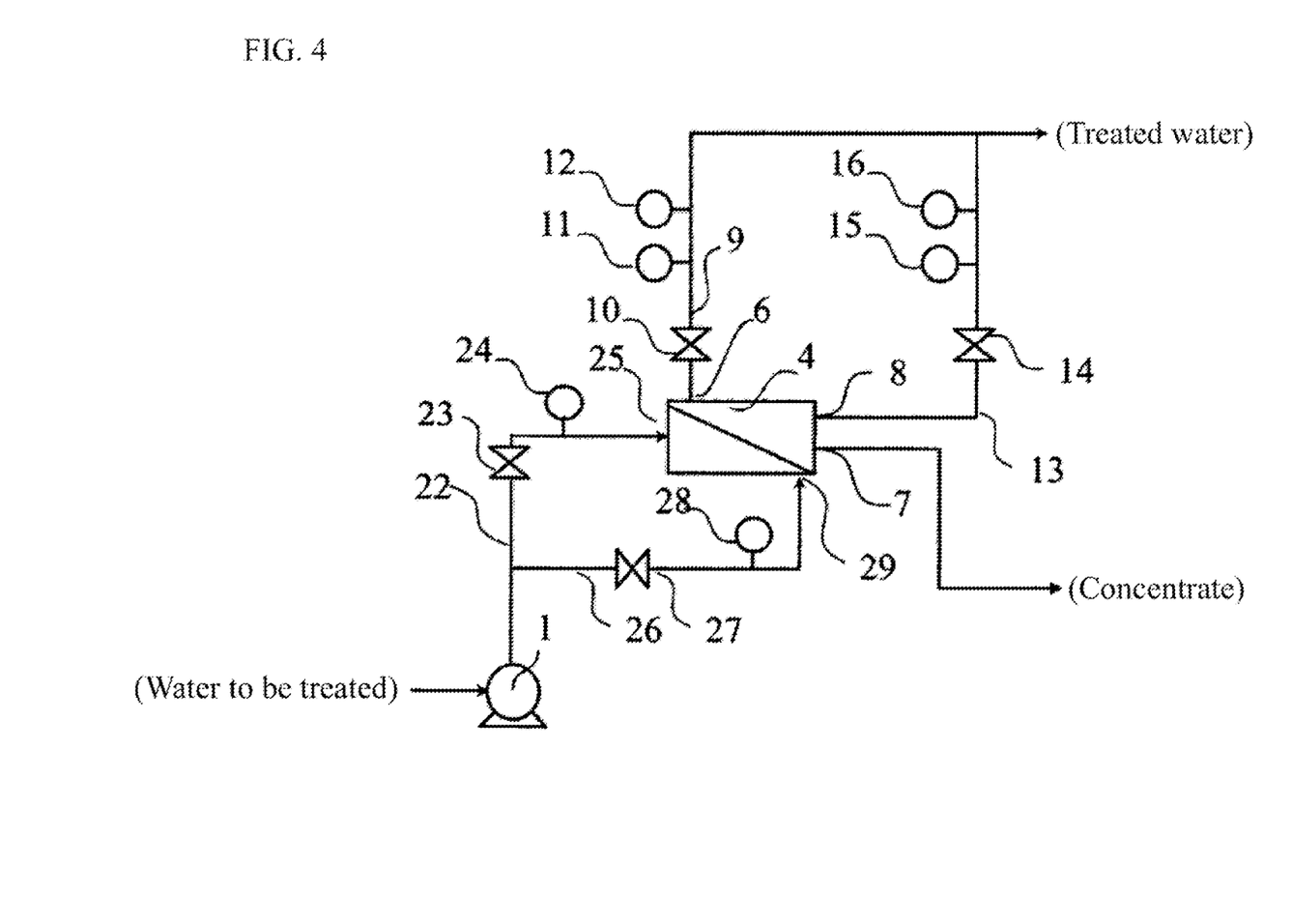
FIG. 4 is a schematic flowchart showing another example of the configurations of water treatment devices for practicing the method according to embodiments of the present invention for inspecting a separation membrane module.

FIG. 4 is a schematic flowchart showing another example of the configurations of water treatment devices for practicing the method according to embodiments of the present invention for inspecting a separation membrane module. As FIG. 4 shows, a plurality of water-to-be-treated feed ports are provided to a separation membrane module 4 and the flow rates of water-to-be-treated being fed through the plurality of water-to-be-treated feed ports are changed. Thus, the direction of the flow of the water-to-be-treated in the separation membrane module can be changed, making it possible to prepare a plurality of water-quality profiles for respective flow directions. By comparing the plurality of water-quality profiles thus prepared for one separation membrane module, the occurrence of an abnormality can be detected with higher accuracy.

In cases when chemical cleaning for removing fouling substances, scales, etc. attached to the surface of the separation membrane, a rejection-improving treatment in which a rejection improver such as polyethylene glycol is applied to the surface of the separation membrane, a change in conditions for injecting a chemical such as a scale inhibitor or a bactericide, replacement of the reverse osmosis membrane, or the like is conducted, quantitative evaluation for the effect thereof can be performed by preparing the water-quality profiles before and after such a treatment, change, or replacement by the method of preparing a water-quality profile according to one aspect of the present invention and comparing them.

While the present invention has been described in detail and with reference to specific embodiments thereof, it will be apparent to one skilled in the art that various changes and modifications can be made therein without departing from the aim and scope thereof. This application is based on a Japanese patent application filed on Oct. 3, 2018 (Application No. 2018-188080), the entire contents thereof being incorporated herein by reference.

REFERENCE SIGNS LIST

1: High-pressure pump
2: Water-to-be-treated feed pipeline
3: Pressure gauge
4: Separation membrane module
5: Water-to-be-treated feed port
6: First permeate outlet
7: Concentrate outlet
8: Second permeate outlet
9: First permeate pipeline
10: First flow rate control valve
11: First flow meter
12: First water quality analyzer
13: Second permeate pipeline
14: Second flow rate control valve
15: Second flow meter
16: Second water quality analyzer
17: Pressure vessel
18, 18a, 18b, 18c, 18d: Reverse osmosis membrane element
19, 19a, 19b, 19c: Connector
20: End plate
21: End plate
22: First water-to-be-treated feed pipeline
23: First water-to-be-treated selector valve
24: First water-to-be-treated pressure gauge
25: First water-to-be-treated feed port
26: Second water-to-be-treated feed pipeline
27: Second water-to-be-treated selector valve
28: Second water-to-be-treated pressure gauge
29: Second water-to-be-treated feed port

The invention claimed is:

1. A method of inspecting a separation membrane module, the method comprising:
   (1) step 1 of obtaining permeates by feeding a water-to-be-treated to a separation membrane module comprising a water-to-be-treated feed port and a plurality of permeate outlets, the plurality of permeate outlets comprising a first permeate outlet and a second permeate outlet, the first permeate outlet connected to the second permeate outlet to form an open channel;
   (2) step 2 of changing a ratio between flow rates of the respective permeates flowing out through the plurality of permeate outlets, step 2 further comprising changing a first flow rate of permeates flowing out of the first permeate outlet and a second flow rate of permeates flowing out of the second permeate outlet, the first flow rate being controlled by a first flow rate control valve and the second flow rate being controlled by a second flow rate control valve;
   (3) step 3 of measuring water qualities of the respective permeates after the step 2; and
   (4) step 4 of plotting a relation between the ratio between the flow rates of the respective permeates, which was changed in the step 2, and the water qualities of the respective permeates, which were measured in the step 3, as a scatter diagram, and
   repeatedly performing the steps 2 to 4 several times and from a width over which a water quality fluctuates at an inflection point of the scatter diagram, a number of the inflection points which appear in the scatter diagram, or a position of each of the inflection points of the scatter diagram, detecting a presence or absence of an abnormality in the separation membrane module, a degree of the abnormality, or a location where the abnormality occurred.

2. The method of inspecting a separation membrane module according to claim 1, wherein
   (1) in the step 1, the water-to-be-treated is fed at a flow rate Q1 to the separation membrane module, and
   (2) in the step 2, the ratio between the flow rates of the respective permeates is changed while maintaining the flow rate Q1 of the water-to-be-treated and maintaining a total flow rate Q2 of the respective permeates flowing out through the plurality of permeate outlets.

3. The method of inspecting a separation membrane module according to claim 1, wherein the plurality of permeate outlets are disposed at different positions along a longitudinal direction of the separation membrane module.

4. The method of inspecting a separation membrane module according to claim 1, wherein the water quality measured in the step 3 is an index selected from the group consisting of electrical conductivity, resistivity, evaporation-residue concentration, salt concentration, boron concentration, ultraviolet absorbance, radioactive-substance concentration, and turbidity.

* * * * *